United States Patent
Xu et al.

(10) Patent No.: US 10,962,487 B2
(45) Date of Patent: Mar. 30, 2021

(54) FLAW DETECTING APPARATUS, METHOD FOR DETECTING FLAW OF PLANE MIRROR BASED ON LINE SCANNING AND RING BAND STITCHING

(71) Applicant: The Institute of Optics and Electronics, The Chinese Academy of Sciences, Sichuan (CN)

(72) Inventors: Fuchao Xu, Sichuan (CN); Haiyang Quan, Sichuan (CN); Taotao Fu, Sichuan (CN); Xiaochuan Hu, Sichuan (CN); Xi Hou, Sichuan (CN); Sheng Li, Sichuan (CN)

(73) Assignee: The Institute of Optics and Electronics, The Chinese Academy of Sciences, Sichuan (CN)

( * ) Notice: Subject to any disclaimer, the term of this patent is extended or adjusted under 35 U.S.C. 154(b) by 0 days.

(21) Appl. No.: 16/681,091

(22) Filed: Nov. 12, 2019

(65) Prior Publication Data
US 2020/0150053 A1 May 14, 2020

(30) Foreign Application Priority Data
Nov. 13, 2018 (CN) .......................... 201811342863.1

(51) Int. Cl.
*G01N 21/898* (2006.01)
*D06H 3/08* (2006.01)
*G02B 26/10* (2006.01)

(52) U.S. Cl.
CPC .......... *G01N 21/8983* (2013.01); *D06H 3/08* (2013.01); *G02B 26/105* (2013.01)

(58) Field of Classification Search
CPC ..... G01N 21/8983; D06H 3/08; G02B 26/105
USPC ........................................................ 356/430
See application file for complete search history.

(56) References Cited

U.S. PATENT DOCUMENTS

| | | | |
|---|---|---|---|
| 8,755,590 B2* | 6/2014 | Sandstrom | G02B 26/105 382/153 |
| 2010/0142757 A1* | 6/2010 | Sandstrom | G03F 7/704 382/100 |
| 2013/0238111 A1* | 9/2013 | Whipple | G05B 19/41875 700/110 |
| 2017/0371142 A1* | 12/2017 | Anthony | H04N 1/00 |

* cited by examiner

*Primary Examiner* — Roy M Punnoose
(74) *Attorney, Agent, or Firm* — Merchant & Gould P.C.

(57) ABSTRACT

A flaw detecting apparatus and a method for a plane mirror based on line scanning and ring band stitching are provided. The flaw detecting apparatus comprises: a line scanning detector, an annular illumination source, a rotary table rotatable about a Z axis, a translation table translatable along an X axis and a processor. By translating and rotating the plane mirror to be detected, an entire surface of the plane mirror to be detected can be detected by the line scanning detector, and the flaw of the entire plane mirror to be detected is obtained by a ring band stitching method. The method of line scanning and ring band stitching reduces the imaging distortion, the intermediate data amount, the difficulty in the distortion correction and difficulty in stitching, and improves the detection speed and the detection quality.

8 Claims, 2 Drawing Sheets

FLAW DETECTING APPARATUS, METHOD FOR DETECTING FLAW OF PLANE MIRROR BASED ON LINE SCANNING AND RING BAND STITCHING

CROSS-REFERENCE TO RELATED APPLICATION

The present application claims the benefit of Chinese Patent Application No. 201811342863.1 filed on Nov. 13, 2018 in the State Intellectual Property Office of China, the whole disclosure of which is incorporated herein by reference.

TECHNICAL FIELD

The embodiments of the present disclosure belong to the field of optical detection, and relate to a flaw detecting apparatus and method for a large-diameter plane mirror based on line scanning and ring band stitching.

BACKGROUND

A lithography lens is a complex optical system which consists of dozens of lenses. Some of plane mirrors have large diameter, and thus it is difficult to develop corresponding standard lenses. A stitching measurement is performed by planning and dividing a mirror into a plurality of small sub-apertures and measuring them one by one, and then combining the sub-aperture surface shapes into a whole mirror surface shape by an algorithm. At the beginning of the 21st century, QED Company of the United States produced a SSI automatic stitching interferometer to implement an automatic stitching measurement to optical components, but the detection accuracy is relatively poor, such that it may only be used as a middle-process detection instrument in a high-precision lens processing. A most important reason for its poor precision is that, during the process of stitching measurement, an outer ring region of a piece to be detected needs to be tilted by a certain angle to match the state of a standard mirror, while such a tilt causes the piece to be detected to be subjected to a deformation, and the amount of deformation will be directly introduced into the detection result, which cannot achieve a high detection precision.

Surface flaws of an optical component refer to processing defects such as pitting, scratches, open air bubbles, broken points and broken edges in the surface(s) of the optical component after being processed by a polishing. The flaws in the surface(s) of the optical component cause a diffusing of a light beam when it passes through a flaw region having above flaws, and deviates from a preset direction, thus seriously affecting an optical performance of an optical system, which should be effectively controlled during processing.

A description and measurement of the surface flaws of traditional optical components are mainly performed by means of visually observing the image(s) of flaw image. The result thereof is greatly influenced by subjective will of the observer. At present, a current surface flaw detecting apparatus operates mainly based on a scanning by an area camera, which has disadvantages of a large amount of sub-apertures, a long detection time, a large amount of intermediate data, a substantial distortion of imaging of these sub-aperture data, and difficulty in distortion correction and position correction during stitching.

SUMMARY

In order to solve the above problems, the present disclosure proposes a flaw detecting apparatus and a method for a large-diameter plane mirror based on line scanning and ring band stitching, which implements a flaw detecting to a large-diameter plane mirror by line scanning and ring band stitching.

In order to achieve above purpose, the present disclosure provides a flaw detecting apparatus for a plane mirror based on line scanning and ring band stitching, which comprises: a line scanning detector, an annular illumination source, a rotary table rotatable about a Z axis, a translation table translatable along a X axis, a processor, and the structural diagram of the flaw detecting apparatus is shown in FIG. 1. The rotary table rotatable about the Z axis is disposed on the translation table translatable along an X axis, the plane mirror to be detected is placed on the rotary table rotatable about the Z axis, and the annular illumination source and the line scanning detector are arranged above the plane mirror to be detected. The processor is connected with the line scanning detector, the rotary table rotatable about the Z axis, and the translation table translatable along the X axis to send out a control signal. The X and Z axes are a first axis and a third axis of a spatial Cartesian coordinate system, respectively.

In an embodiment, the plane mirror to be detected is rotated about the Z axis with the rotary table, and the line scanning detector detects the flaw on the plane mirror to be detected, according to a control command of the processor.

Further, the present disclosure also provides a method for detecting a flaw of the plane mirror based on line scanning and ring band stitching using the flaw detecting apparatus mentioned above, which method comprises the following steps:

(1) planning a scan detection scheme; according to the parameters of the plane mirror to be detected and the line scanning detector, planning the number and positions of the ring bands, so that there is a certain degree of overlap between two adjacent ring bands, and carrying out a scan across all range of the plane mirror to be detected, and calculating the angular velocity of the rotary table according to the position of the ring band and the parameters of the line scanning detector when each ring band is scanned; as shown in FIG. 2, the angular velocity $\omega_k$ (k=1, 2, ..., M) of the rotary tables for respective ring band is related to the number N of pixels of the line scanning detector, a frame rate $\eta$ of the line scanning detector, an object-side view field L of the line scanning detector, and the distance $px_k$ of each ring band from the center of the plane mirror to be detected, and a specific relationship is written as follows:

$$\omega_k = \eta L N / (px_k + L).$$

where k=1, 2, ..., M, is the serial number of respective ring band, $px_1=0$.

(2) detecting the first ring band; building a measuring table as shown in FIG. 3, and the processor controlling the translation table to shift a distance $px_1+L$ in the X direction, and then the processor controlling the rotary table to rotate one revolution at an angular velocity $\omega_1$, and the processor controlling the line scanning detector to acquire data at a frame rate $\eta$, and then storing the data $f_1$, where $f_1$ is an image of $N \times J_1$ pixels, and $J_1$ is the number of frames measured by the scanning detector when the rotary table rotates one revolution at the angular velocity $\omega_1$;

(3) sequentially detecting the rest of the ring bands; controlling the translation table to shift a distance $px_k+L$ in the X direction, and then the processor controls the rotary table to rotate one revolution at an angular velocity $\omega_k$, and the processor controls the line scanning detector to acquire data at a frame rate $\eta$, and storing the data $f_k$ with the processor, where $f_k$ is an image of N×$J_k$ pixels, and $J_k$ is the number of frames measured by the scanning detector when the rotary table rotates one revolution at an angular velocity $\omega_k$ for detecting the kth ring band, $f_k$ being shown in FIG. 4;

(4) performing a coordinate transformation, a position error correction and a region growth method to the data of respective detected ring band so as to stitch them into one image, such a step is specifically performed as follows:

a) performing a coordinate transformation to the data of respective detected ring band according to the following formula, the schematic diagram of $f_k$ being changed from FIG. 4 into the $F_k$ in the global coordinates $$F_k(x, y) = f_k(u_k, v_k)$$

$$x = \left(\frac{px_k}{\frac{L}{N}} + u_k\right)\cos\left(\frac{\omega_k v_k}{\eta}\right)$$

$$y = \left(\frac{px_k}{\frac{L}{N}} + u_k\right)\sin\left(\frac{\omega_k v_k}{\eta}\right)$$

where ($u_k$, $v_k$) is a point in $f_k$, and the value of $u_k$ is 1, 2, ..., N, and the value of $v_k$ is 1, 2, ..., $J_k$. (x, y) is the point in the global coordinates corresponding to ($u_k$, $v_k$).

b) analyzing the position error of the respective ring bands. When detecting data of respective ring band, there is a position error $\Delta px_k$, and since the stitching is based on the first ring band, that is, $\Delta px_1$ is 0, the coordinate transformation formula including the position error correction is expressed the following equation, $$F_k(x + \varepsilon_x \Delta px_k, y + \varepsilon_y \Delta px_k) = f_k(u_k, v_k)$$

$$\varepsilon_x = \frac{\cos\left(\frac{\omega_k v_k}{\eta}\right)}{\frac{L}{N}}$$

$$\varepsilon_y = \frac{\sin\left(\frac{\omega_k v_k}{\eta}\right)}{\frac{L}{N}}.$$

c) calculating the position error $\Delta px_k$ (k=2, 3, ..., M) of the respective ring bands, so as to minimize the error $e_k$ of the overlapping region of the stitching result $G_{k-1}$ of the previous k−1 ring bands and $F_k$, where $G_1=F_1$ and the error $e_k$ of the overlapping region of $G_{k-1}$ and $F_k$ is expressed as follows, the value of $\Delta px_k$ is taken at an interval of 0.5*L/N in the range of [−$E_x$, $E_x$], in case where $e_k$ is at minimum, the corresponding $\Delta px_k$ is the position error of the kth ring band, $$e_k = \sum_{(x,y) \in S_\cap} G_{k-1}(x, y) - F_k(x + \varepsilon_x \Delta px_k, y + \varepsilon_y \Delta px_k)$$

where [−$E_x$, $E_x$] is the error range of the translation table translating in the X direction, which is determined by the positioning accuracy of the translation table, and $S_\cap$ is the overlapping region of $G_{k-1}$ and $F_k$.

d) stitching datum of the ring bands into an image $G_M$ using the region growth algorithm, which is expressed in the following formula $$G_k(x, y) = \begin{cases} G_{k-1}(x, y) & (x, y) \in S_{G_{k-1}} \\ F_k(x + \varepsilon_x \Delta px_k, y + \varepsilon_y \Delta px_k) & (x, y) \in S_{F_k} \\ 0.5 * G_{k-1}(x, y) + 0.5 * \\ F_k(x + \varepsilon_x \Delta px_k, y + \varepsilon_y \Delta px_k) & (x, y) \in S_\cap \end{cases}$$

where $S_{G_{k-1}}$ is the region of $G_{k-1}$, $S_{F_k}$ is the region of $F_k$ which does not contains $S_\cap$, and $G_k$ is the result of stitching of the previous k ring bands.

Advantages of the present disclosure over the prior art are:

1) a line scanning is faster than an area array scanning, the sub-aperture is smaller, the amount of intermediate data is less, and the calculation amount for the stitching is less.

2) the line scanning camera has smaller imaging distortion than that of the area camera, with a better stitching consistency.

3) the line scanning has better position error correction than area array scanning.

DETAILED DESCRIPTION OF EMBODIMENTS

The present disclosure will now be further described with reference to the drawings and specific embodiments.

Figure 1:
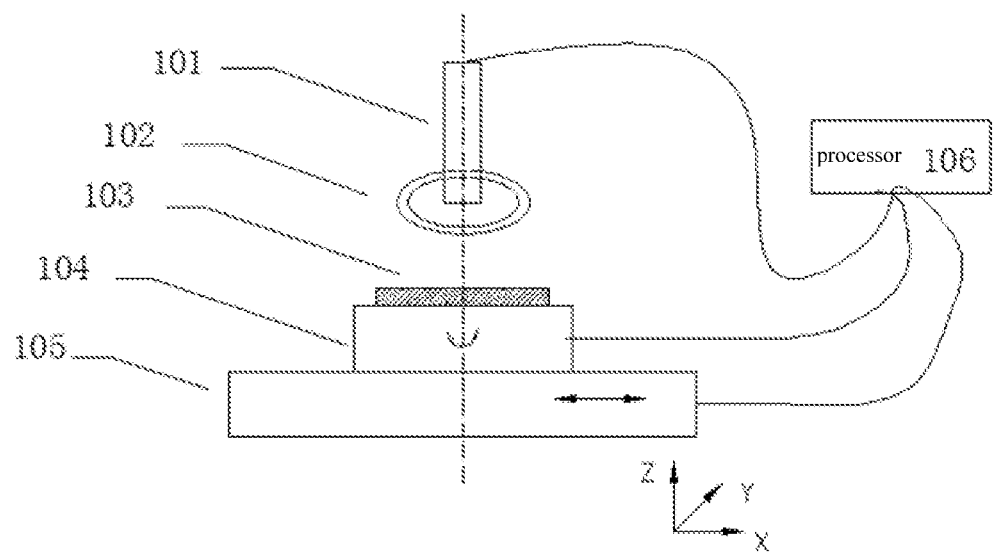
FIG. 1 is a schematic view of a flaw detecting apparatus for a large-diameter plane mirror based on line scanning and ring band stitching according to the present disclosure.

FIG. 1 is a schematic view of a flaw detecting apparatus for a large-diameter plane mirror based on line scanning and ring band stitching according to the present disclosure, the flaw detecting apparatus comprises: a line scanning detector 101, an annular illumination source 102, a rotary table 104, a translation table 105, a processor 106, and a structural diagram of the flaw detecting apparatus is shown in FIG. 1. The X, Y, Z axes are the first, second and third axes of a spatial Cartesian coordinate system on the rotary table 104 and the translation table 105. The rotary table may rotate about the Z axis and the translation table may translate along the X axis. The rotary table 104 is rotatably disposed on the translation table 105, a plane mirror to be detected 103 is placed on the rotary table 104, and the annular illumination source 102 and the line scanning detector 101 are arranged above the plane mirror to be detected 103. The processor 106 is connected with the line scanning detector 101, the rotary table 104 rotatable about the Z axis, and the translation table 105 translatable along the X axis, and is configured to send out a control signal.

In an embodiment, the plane mirror to be detected 103 is rotated about the Z axis with the rotary table 104, and the line scanning detector 101 detects the flaw on the plane mirror to be detected 103, according to a control command of the processor 106.

Further, the method for detecting a flaw of the plane mirror based on line scanning and ring band stitching using the flaw detecting apparatus provided by the present disclosure comprises the following steps:

Step (1) planning a scan detection scheme.

Figure 2:
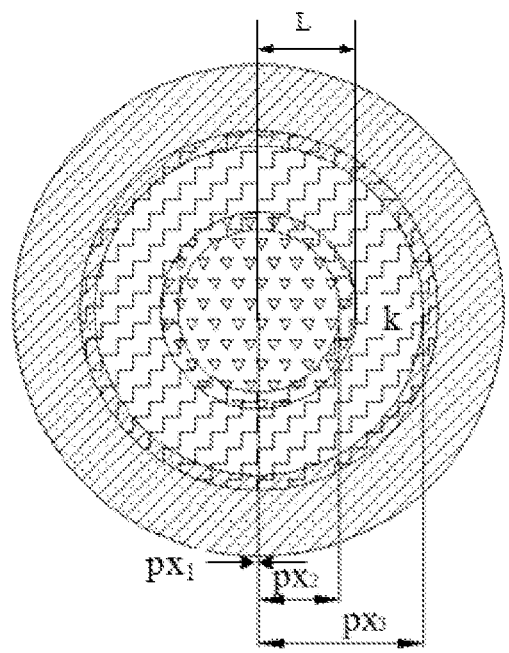
FIG. 2 is a schematic diagram of planning a scanning detection scheme of a flaw detecting method according to the present disclosure.

Specifically, according to parameters of the plane mirror to be detected 103 and the line scanning detector 101, both number M and positions of the ring bands are planned, to an extent that there is a certain degree of overlap between two adjacent ring bands, and then a scan is carried out across all range of the plane mirror to be detected 103, and an angular velocity of the rotary table 104 is calculated according to the positions of the ring bands and the parameters of the line scanning detector 101 when the ring bands are scanned. As shown in FIG. 2, the diameter D of the plane mirror 103 to be measured is 200 mm, the number N of pixels of the line scanning detector 101 is 2000, and the frame rate η of the line scan detector 101 is 3000 times/second, and an object-side view field L is 40 mm, and the parameters of the scanning detection scheme is: the number M of the ring bands is 3, the distance $px_1$ of the first ring band offset from the center of the piece to be tested is 0, and the distance $px_2$ of the second ring band offset from the center of the piece to be tested is 0.8 L, and the distance $px_3$ of the third ring band offset from the center of the piece to be tested is 1.7 L. The angular velocity $\omega_k$ (k=1, 2, ..., M) of the rotary tables 104 for respective ring band can be calculated depending on following equation:

$$\omega_k = \eta L/N/(px_k + L).$$

where k=1, 2, ..., M, is the serial number of respective ring band.

Step (2) detecting the first ring band.

Figure 3:
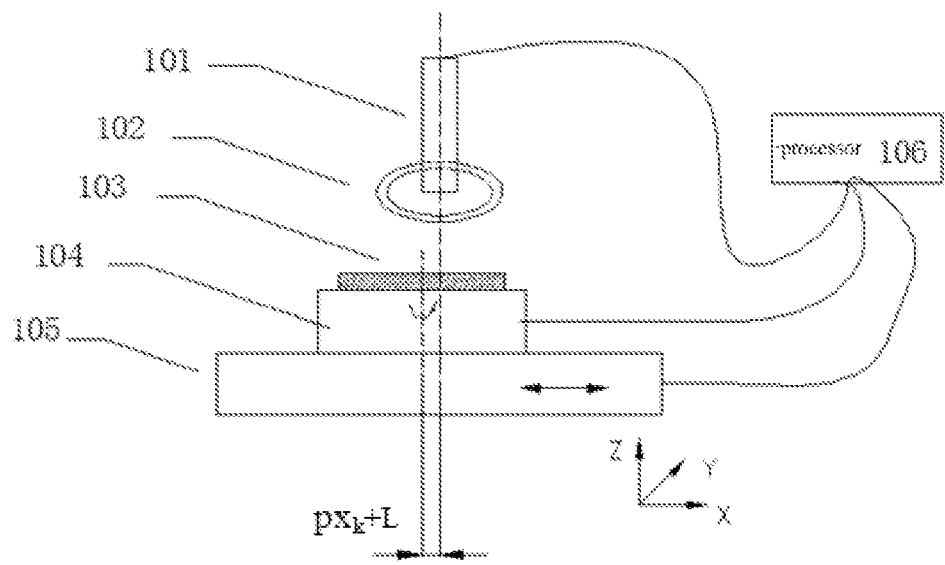
FIG. 3 is a schematic view showing a first ring band of the plane mirror measured by the apparatus of the present disclosure.

A measuring table is built as shown in FIG. 3, the processor 106 controls the translation table 105 to shift a distance $px_1+L$ in the X direction, and then the processor 106 controls the rotary table 104 to rotate one revolution at an angular velocity $\omega_1$, and the processor 106 controls the line scanning detector 101 to acquire data at a frame rate η, and then the data $f_1$ is stored, where $f_1$ is an image of $N \times J_1$ pixels, and $J_1$ is the number of frames measured by the line scanning detector 101 when the rotary table 104 rotates one revolution at the angular velocity $\omega_1$;

Step (3) detecting other ring bands sequentially.

Figure 4:
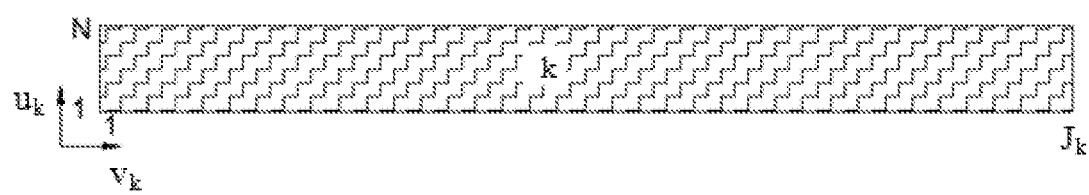
FIG. 4 is a schematic diagram showing a result of line scanning to a kth ring band of the plane mirror measured by the apparatus of the present disclosure.
Figure 5:
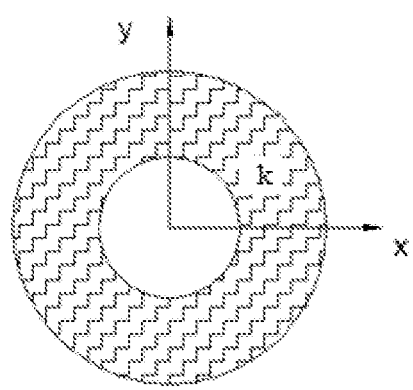
FIG. 5 is a schematic diagram showing the result of line scan of the kth ring band of the plane mirror measured by the apparatus of the present disclosure, after a coordinate transformation thereof.

The processor 106 controls the translation table 105 to shift a distance $px_k+L$ in the X direction, and then the processor 106 controls the rotary table 104 to rotate one revolution at an angular velocity $\omega_k$, and the processor 106 controls the line scanning detector 101 to acquire data at a frame rate η, and then the data $f_k$ is stored, where $f_k$ is an image of $N \times J_k$ pixels, and $J_k$ is the number of frames measured by the line scanning detector 101 when the rotary table 104 rotates one revolution at an angular velocity $\omega_k$ for detecting the kth ring band, $f_k$, is schematically shown in FIG. 4;

Step (4) performing a coordinate transformation, a position error correction and a region growth method to the data of respective detected ring band so as to stitch them into one image. Such a step is specifically performed as follows:

a) performing a coordinate transformation to the data of respective detected ring band according to the following formula, the schematic diagram of $f_k$ being changed from FIG. 4 into the $F_k$ in the global coordinates, as schematically shown in FIG. 5:

$$F_k(x, y) = f_k(u_k, v_k)$$

$$x = \left(\frac{px_k}{\frac{L}{N}} + u_k\right)\cos\left(\frac{\omega_k v_k}{\eta}\right)$$

$$y = \left(\frac{px_k}{\frac{L}{N}} + u_k\right)\sin\left(\frac{\omega_k v_k}{\eta}\right)$$

where $(u_k, v_k)$ is a point in $f_k$, and the value of $u_k$ is 1, 2, ..., N, and the value of $v_k$ is 1, 2, ..., $J_k$. (x, y) is the point in the global coordinates corresponding to $(u_k, v_k)$.

b) analyzing the position error of the respective ring bands. When detecting data of respective ring band, the translation table 105 translates in the X direction, there is a position error $\Delta px_k$, and since the stitching is based on the first ring band, that is, $\Delta px_1$ is 0, the coordinate transformation formula including the position error correction is expressed as the following equation, $$F_k(x + \varepsilon_x \Delta px_k, y + \varepsilon_y \Delta px_k) = f_k(u_k, v_k)$$

$$\varepsilon_x = \frac{\cos\left(\frac{\omega_k v_k}{\eta}\right)}{\frac{L}{N}}$$

$$\varepsilon_y = \frac{\sin\left(\frac{\omega_k v_k}{\eta}\right)}{\frac{L}{N}}.$$

c) calculating the position error $\Delta px_k$ (k=2, 3, ..., M) of the respective ring bands, so as to minimize the error $e_k$ of the overlapping region of the stitching result $G_{k-1}$ of the previous k−1 ring bands and $F_k$, where $G_1 = F_1$ and the error $e_k$ of the overlapping region of $G_{k-1}$ and $F_k$ is expressed as follows, the value of $\Delta px_k$ is taken at an interval of 0.5*L/N in the range of $[-E_x, E_x]$, in case where $e_k$ is at minimum, the corresponding $\Delta px_k$ is the position error of the kth ring band, $$e_k = \sum_{(x,y) \in S_\cap} G_{k-1}(x, y) - F_k(x + \varepsilon_x \Delta px_k, y + \varepsilon_y \Delta px_k)$$

where $[-E_x, E_x]$ is the error range of the translation table 105 translating in the X direction, which is determined by the positioning accuracy of the translation table 105, and $S_\cap$ is the overlapping region of $G_{k-1}$ and $F_k$.

d) stitching datum of the ring bands into an image $G_M$ using the region growth algorithm, which is expressed in the following formula $$G_k(x, y) = \begin{cases} G_{k-1}(x, y) & (x, y) \in S_{G_{k-1}} \\ F_k(x + \varepsilon_x \Delta px_k, y + \varepsilon_y \Delta px_k) & (x, y) \in S_{F_k} \\ 0.5 * G_{k-1}(x, y) + 0.5 * \\ F_k(x + \varepsilon_x \Delta px_k, y + \varepsilon_y \Delta px_k) & (x, y) \in S_\cap \end{cases}$$

where $S_{G_{k-1}}$ is the region of $G_{k-1}$, $S_{F_k}$ is the region of $F_k$ which does not contains $S_\cap$, and $G_k$ is the result of stitching of the previous k ring bands.

The context which is not elaborated in the present disclosure belongs to the well-known techniques of those skilled in the art.

The above is only the specific embodiment of the present disclosure, but the scope of the present disclosure is not limited thereto, and any change or replacement made by those skilled in the art within the technical scope of the present disclosure should be covered by the present disclosure. The scope of the present disclosure should be determined by the scope of the claims.

What is claimed is:

1. A flaw detecting apparatus for a plane mirror based on line scanning and ring band stitching, comprising: a line scanning detector, an annular illumination source, a rotary table rotatable about a Z axis, a translation table translatable along a X axis, a processor, wherein the rotary table rotatable about the Z axis is disposed on the translation table translatable along a X axis, the plane mirror to be detected is placed on the rotary table rotatable about the Z axis, and the annular illumination source and the line scanning detector are mounted above the plane mirror to be detected, wherein the processor is connected with the line scanning detector, the rotary table rotatable about the Z axis, and the translation table translatable along the X axis to send out a control signal, wherein the X and Z axes are a first axis and a third axis of a spatial Cartesian coordinate system respectively.

2. The flaw detecting apparatus according to claim 1, wherein the plane mirror to be detected is rotated about the Z axis with the rotary table, and the line scanning detector detects a flaw on the plane mirror to be detected, according to a control command of the processor.

3. A method for detecting a flaw of the plane mirror based on line scanning and ring band stitching using the flaw detecting apparatus according to claim 1, comprising the following steps:
   (1) planning a scan detection scheme; according to parameters of the plane mirror to be detected and the line scanning detector, planning number and positions of the ring bands, so that there is a certain degree of overlap between two adjacent ring bands, and carrying out a scan across all range of the plane mirror to be detected, and calculating the angular velocity of the rotary table according to the position of the ring band and the parameters of the line scanning detector when each ring band is scanned;
   (2) detecting the first ring band; controlling the translation table to shift a distance $px_1+L$ in the X direction with the processor, and then controlling the rotary table to rotate one revolution at an angular velocity $\omega_1$ with the processor, and controlling the line scanning detector to acquire data at a frame rate $\eta$ with the processor, and then storing the data $f_1$ with the processor, where $f_1$ is an image of $N \times J_1$ pixels, and $J_1$ is the number of frames measured by the scanning detector when the rotary table rotates one revolution at the angular velocity $\omega_1$;
   (3) sequentially detecting the rest of the ring bands; controlling the translation table to shift a distance $px_k+L$ in the X direction with the processor, and then controlling the rotary table to rotate one revolution at an angular velocity $\omega_k$ with the processor, and controlling the line scanning detector to acquire data at a frame rate $\eta$ with the processor, and storing the data $f_k$ with the processor, where $f_k$ is an image of $N \times J_k$ pixels, and $J_k$ is the number of frames measured by the scanning detector when the rotary table rotates one revolution at an angular velocity $\omega_k$ for detecting the kth ring band;
   (4) performing a coordinate transformation, a position error correction and a region growth method to the data of respective detected ring band so as to stitch them into one image.

4. The method according to claim 3, wherein the angular velocity $\omega_k$ (k=1, 2, ..., M) of the rotary tables for respective ring band is related to the number N of pixels of the line scanning detector, the frame rate $\eta$ of the line scanning detector, an object-side view field L of the line scanning detector, and the distance $px_k$ of each ring band from the center of the plane mirror to be detected, and the specific relationship is written as follows:

$$\omega_k = \eta L/N/(px_k+L).$$

5. The method according to claim 3, wherein performing a coordinate transformation to the data of respective detected ring band according to the following formula $$F_k(x, y) = f_k(u_k, v_k)$$
$$x = \left(\frac{px_k}{\frac{L}{N}} + u_k\right)\cos\left(\frac{\omega_k v_k}{\eta}\right)$$
$$y = \left(\frac{px_k}{\frac{L}{N}} + u_k\right)\sin\left(\frac{\omega_k v_k}{\eta}\right)$$

where ($u_k$, $v_k$) is a point in $f_k$, and the value of $u_k$ is 1, 2, ..., N, and the value of $v_k$ is 1, 2, ..., $J_k$. (x, y) is the point in the global coordinates corresponding to ($u_k$, $v_k$).

6. The method according to claim 3, wherein when detecting data of respective ring band, there is a position error $\Delta px_k$, and since the stitching is based on the first ring band, that is, $\Delta px_1$ is 0, the coordinate transformation formula including the position error correction is expressed the following equation, $$F_k(x + \varepsilon_x \Delta px_k, y + \varepsilon_y \Delta px_k) = f_k(u_k, v_k)$$
$$\varepsilon_x = \frac{\cos\left(\frac{\omega_k v_k}{\eta}\right)}{\frac{L}{N}}$$
$$\varepsilon_y = \frac{\sin\left(\frac{\omega_k v_k}{\eta}\right)}{\frac{L}{N}}.$$

7. The method according to claim 3, wherein the position error $\Delta px_k$ (k=2, 3, ..., M) of the respective ring bands is calculated, so as to minimize the error $e_k$ of the overlapping region of the stitching result $G_{k-1}$ of the previous k−1 ring bands and $F_k$, where $G_1=F_1$ and the error $e_k$ of the overlapping region of $G_{k-1}$ and $F_k$ is expressed as follows, the value of $\Delta px_k$ is taken at an interval of 0.5*L/N in the range of $[-E_x, E_x]$, in case where $e_k$ is at minimum, the corresponding $\Delta px_k$ is the position error of the kth ring band, $$e_k = \sum_{(x,y) \in S_\cap} G_{k-1}(x, y) - F_k(x + \varepsilon_x \Delta px_k, y + \varepsilon_y \Delta px_k) \tag{5}$$

where $[-E_x, E_x]$ is the error range of the translation table translating in the X direction, which is determined by the positioning accuracy of the translation table, and $S_\cap$ is the overlapping region of $G_{k-1}$ and $F_k$.

8. The method according to claim 3, wherein stitching datum of the respective ring band into an image $G_M$ using the region growth algorithm, which is expressed in the following formula $$G_k(x, y) = \begin{cases} G_{k-1}(x, y) & (x, y) \in S_{G_{k-1}} \\ F_k(x + \varepsilon_x \Delta px_k, y + \varepsilon_y \Delta px_k) & (x, y) \in S_{F_k} \\ 0.5 * G_{k-1}(x, y) + 0.5 * \\ F_k(x + \varepsilon_x \Delta px_k, y + \varepsilon_y \Delta px_k) & (x, y) \in S_\cap \end{cases}$$

where $S_{G_{k-1}}$ is the region of $G_{k-1}$, $S_{F_k}$ is the region of $F_k$ which does not contains $S_\cap$, and $G_k$ is the result of stitching of the previous k ring bands.

\* \* \* \* \*